B. F. & A. H. STOVER.
Churn Dasher.
No. 78,025.
Patented May 19, 1868.
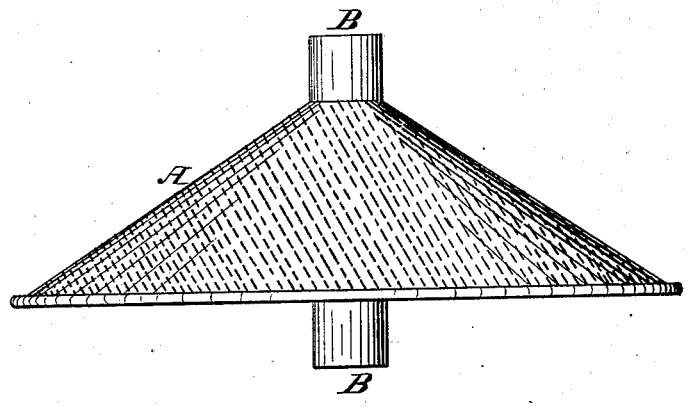
Witnesses.
O. C. Aslakettle
Theo. Finckh
Inventor:
B. F. Stover
A. H. Stover.
per Munn & Co
Atty.

United States Patent Office.

BENJAMIN F. STOVER AND ABRAM H. STOVER, OF LADOGA, INDIANA.

Letters Patent No. 78,025, dated May 19, 1868.

IMPROVEMENT IN CHURN-DASHER HEAD.

The Schedule referred to in these Letters Patent and making part of the same.

TO ALL WHOM IT MAY CONCERN:

Be it known that we, BENJAMIN F. STOVER and ABRAM H. STOVER, of Ladoga, in the county of Montgomery, and State of Indiana, have invented a new and improved Churn-Dasher Head; and we do hereby declare that the following is a full, clear, and exact description thereof, which will enable those skilled in the art to make and use the same, reference being had to the accompanying drawing forming part of this specification.

The drawing represents our improved churn-dasher head in elevation.

Our improved dasher-head is made of very finely-perforated or reticulated metal, concave on its under side, and is provided with a socket, extending upward and downward to a sufficient distance to firmly brace and secure it upon a common dasher-staff.

In practice we make the apertures in the metal very small and numerous, at least one hundred to a square inch. By reason of the diminutive size, and great number of the apertures, it is made impossible for cream to pass through without the oil-cells or globules being broken, and this renders the invention essentially different in practical effect from any dasher which is provided with a comparatively small number of larger perforations.

A represents the concave head, and B the socket, soldered or brazed thereto. The said socket is adapted to receive a common dasher-staff, and extends upward and downward to a sufficient length to securely brace the head upon the staff.

The material may be tin, copper, brass, or any finely-perforated metal plate, or a fine wire gauze may be employed in its construction, as the object to be attained is intense action on the cream, by friction in the process of churning, produced by its pressure through the fine holes when the conical dasher-head plunges down in the churn.

The advantage of this construction is a rapid liberation and separation of the globules of butter from the whey or serous matter of milk and cream, by means of the fine holes, through which the whole mass passes in the process of churning.

The device is also very cheap, simple, convenient, cleanly, and durable.

Having thus described our invention, we claim as new, and desire to secure by Letters Patent—

The concave head A, of finely-perforated or reticulated metal, having a socket, B, as and for the purpose specified.

BENJAMIN F. STOVER,
ABRAM H. STOVER.

Witnesses:
ALBERT ALLEN,
R. D. YARD.